(No Model.)

E. JONES, C. DAWSON & H. STANTON.
JOURNAL BOX.

No. 477,329. Patented June 21, 1892.

Witnesses

Inventors
Edward Jones
Chalkley Dawson
Henry Stanton
By T. J. W. Robertson, Atty

UNITED STATES PATENT OFFICE.

EDWARD JONES AND CHALKLEY DAWSON, OF BELLAIRE, AND HENRY STANTON, OF FLUSHING, OHIO.

JOURNAL-BOX.

SPECIFICATION forming part of Letters Patent No. 477,329, dated June 21, 1892.

Application filed February 29, 1892. Serial No. 423,218. (No model.)

*To all whom it may concern:*

Be it known that we, EDWARD JONES and CHALKLEY DAWSON, residing at Bellaire, and HENRY STANTON, residing at Flushing, in the county of Belmont and State of Ohio, citizens of the United States, have invented certain new and useful Improvements in Journal-Boxes, of which the following is a specification, reference being had therein to the accompanying drawings.

This improvement relates, mainly, to a journal-box for cars, more particularly mining and similar cars; and the invention consists in the peculiar construction, arrangement, and combinations of parts hereinafter more particularly described, and then definitely claimed.

Figure 1:
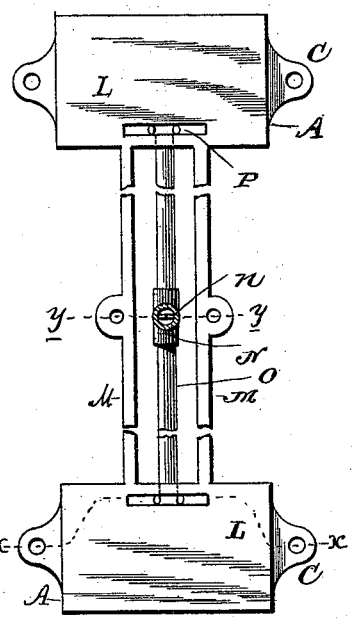
Figure 2:
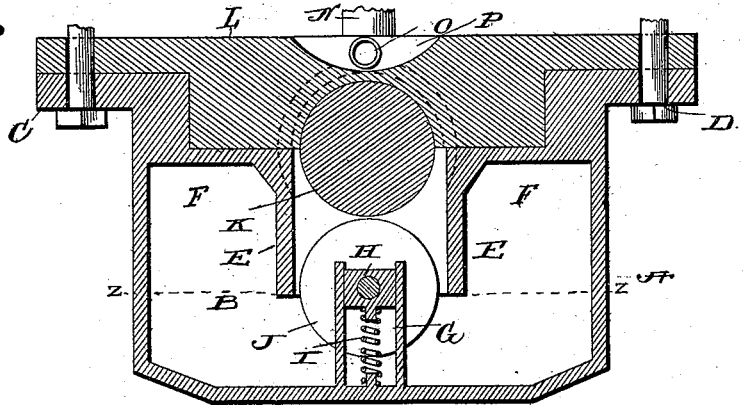
Figure 3:
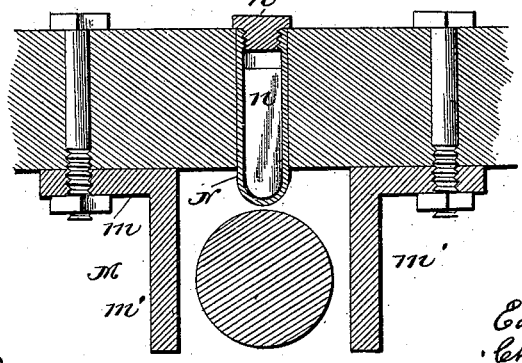

In the accompanying drawings, Figure 1 is a top plan of a duplex bearing and oil-box constructed according to our improvement. Fig. 2 is a vertical transverse section, on a larger scale, on the line $x$ $x$, Fig. 1. Fig. 3 is a similar section on the line $y$ $y$, also Fig. 1.

Referring now to the details of the drawings by letters, A is an oil-box provided with a chamber B to contain the oil and ears C, perforated to receive the bolts D, by which it is secured in place to the floor of the car. On the inside of this box are two (preferably) dependent webs or partitions E, leaving an air and oil tight space F between the partition and the outer wall of the box on each side thereof above the bottom edge of said webs E, as indicated by the dotted line $z$ $z$.

In the bottom of the box is shown a socket G, adapted to receive a small bearing H, beneath which is a spiral spring I, tending to force said bearing H upward. There are two of these bearings and springs, (only one of which is shown,) and they carry a roller J, which is held by the springs against the axle K, so as to always keep the same lubricated by carrying up the oil contained in the box as the roller J is revolved by contact with the axle K.

Above the axle at each end is a bearing L, connected to a cross-piece M, having a horizontal flange $m$ and rib $m'$ on each side, as shown at Fig. 3. At the center of the cross-piece is an inverted-T piece N, something like a gas-fitter's T, but provided with a division $n$ in the center and a screw-stopper $n'$. To the opposite ends of the horizontal arm of the T are connected the pipes O, which run along between the ribs $m'$ to a groove or aperture P in the bearing, so that any oil dropped in at the top or mouth of the T N will be divided by the partition $n$ and pass off in opposite directions through the pipes O into the aperture P and then into the oil-box. It will thus be seen that by dropping oil into the T N both ends of the duplex bearing will be simultaneously supplied with the oil in substantially equal quantities and that the oil thus supplied to the oil-boxes will be continually carried up to axle K by the roller J as the latter is revolved by the axle, so that but little attention is required to keep the bearings well lubricated, as one supply of oil will last six months. Besides this convenience in supplying the lubricant there is a great saving of oil effected by the use of the partitions E, for in the case of dumping-cars, where the car has to be inverted, or nearly so, the oil contained in the box would run out; but the partitions prevent this, for the oil would pass behind the partitions and be there retained until the car was again turned back to its normal position, so that there is no chance for the oil to be lost, even if the car be inverted, unless more oil is put in than can be retained in the space F. Where the car is dumped in one direction only but one partition E is necessary; but where the car is liable to be dumped in either direction there should be two partitions.

What we claim as new is—

1. In a journal-box, the bearings L, connected by a cross-piece M, substantially as described.

2. In a journal-box, the bearings L, connected by the cross-piece M, having flange $m$ and rib $m'$, substantially as described.

3. In a journal-box, the bearings L, connected by the cross-piece M, and the oil-carrier N, arranged between the ribs of the cross-piece and supplying oil to both bearings, substantially as described.

4. In a journal-box, the bearings L, the pipes O O, and the T N, having partition in the center to divide the oil, substantially as described.

5. In a journal-box, the oil-receiver provided with a partition E, forming an air-tight chamber above the bottom of said partition, whereby the oil is saved in case the car is dumped in one direction, substantially as described.

6. In a journal-box, an oil-receiver provided with a partition on each side, forming an air-tight chamber on each side of the box above the bottom of said partitions, whereby the oil is saved in case the car is dumped in opposite direction at different times, as set forth.

In testimony whereof we affix our signatures, in presence of two witnesses, this 19th day of February, 1892.

EDWARD JONES.
CHALKLEY DAWSON.
HENRY STANTON.

Witnesses:
CHAS. ROEDER,
ANDREW ROEDER.